Nov. 11, 1958  H. C. WINKEL ET AL  2,859,859
BATTERY GRID STACKING APPARATUS
Filed March 28, 1957  3 Sheets-Sheet 1

INVENTORS.
Herbert C. Winkel,
Charles H. McAlpine,
Harry H. Meschke,
By Fidler, Crouse and
      Beardsley   Attys.

Nov. 11, 1958     H. C. WINKEL ET AL     2,859,859
BATTERY GRID STACKING APPARATUS

Filed March 28, 1957     3 Sheets-Sheet 2

INVENTORS.
Herbert C. Winkel,
Charles H. McAlpine,
Harry H. Meschke,
By Fidler, Crouse and Beardsley    Att'ys Nov. 11, 1958   H. C. WINKEL ET AL   2,859,859
BATTERY GRID STACKING APPARATUS
Filed March 28, 1957   3 Sheets-Sheet 3

INVENTORS.
Herbert C. Winkel,
Charles H. McAlpine,
Harry H. Meschke,
By Fidler, Crouse and
Beardsley   Attys

United States Patent Office 2,859,859
Patented Nov. 11, 1958

2,859,859

BATTERY GRID STACKING APPARATUS

Herbert C. Winkel, Watervliet, Charles H. McAlpine, Coloma, and Harry H. Meschke, Benton Harbor, Mich.; said McAlpine and said Meschke assignors to said Winkel Application March 28, 1957, Serial No. 649,093

7 Claims. (Cl. 198—35)

This invention relates to battery grid stacking apparatus and it is an object of the invention to provide improved apparatus of that character.

Grids for storage batteries are commonly cast and trimmed seriatim by machine, for example by a machine such as that disclosed and claimed in patent application Serial No. 470,677 entitled, Multiple Mold Grid Molding Trimming and Sorting Machines, filed November 23, 1954, now Patent No. 2,789,317, by Herbert C. Winkel, hereinafter referred to as the prior application. In the prior application apparatus is also disclosed for stacking or sorting the completed grids. The present invention is directed specifically toward improved stacking apparatus which may be employed with any source of battery grids.

In the prior application eight molds are employed for casting battery grids and the completed castings are fed seriatim from the various molds to a single trimming machine. With the trimming machine disclosed in the prior application and disclosed and claimed in Patent No. 2,467,246 issued April 12, 1949, to Herbert C. Winkel, it is possible to trim battery grids of substantially differing widths without adjustment. Accordingly, the various molds may produce grid castings of differing widths. They may also produce grids of differing weights or thicknesses and of differing patterns in various respects. In such case it is desirable that successive grids delivered by the trimming machine be deposited in a plurality of stacks such that the differing grids from the various molds are stacked separately.

It is another object of the present invention to provide improved apparatus for stacking battery grids as received from a casting and trimming machine.

It is a further object of the invention to provide improved stacking or sorting apparatus cooperable with a multiple mold and trimming machine in which the various molds produce differing battery grids, said apparatus being arranged to stack the differing battery grids in separate stacks.

This invention, together with further objects and advantages thereof, will best be understood by reference to the following description taken in connection with the accompanying drawings, and its scope will be pointed out in the appended claims.

In the drawings, in which like parts are designated by like reference numerals:

Where apparatus embodying the present invention is employed with a battery grid casting and trimming machine the latter may be of any desired form, such as that disclosed in the prior application, and since it does not of itself constitute a feature of the present invention, it is not disclosed herein. For the purpose of the present disclosure it is believed to be sufficient to point out that completed battery grids are fed seriatim to the stacking apparatus which incorporates the present invention, and that if the battery grids fed thereto differ from each other in any significant respect, the differing battery grids are fed thereto in repeated sequence. The stacking apparatus is arranged to stack the battery grids in accordance with the repeated sequence such that the differing battery grids are sorted as they are stacked.

Figure 1:
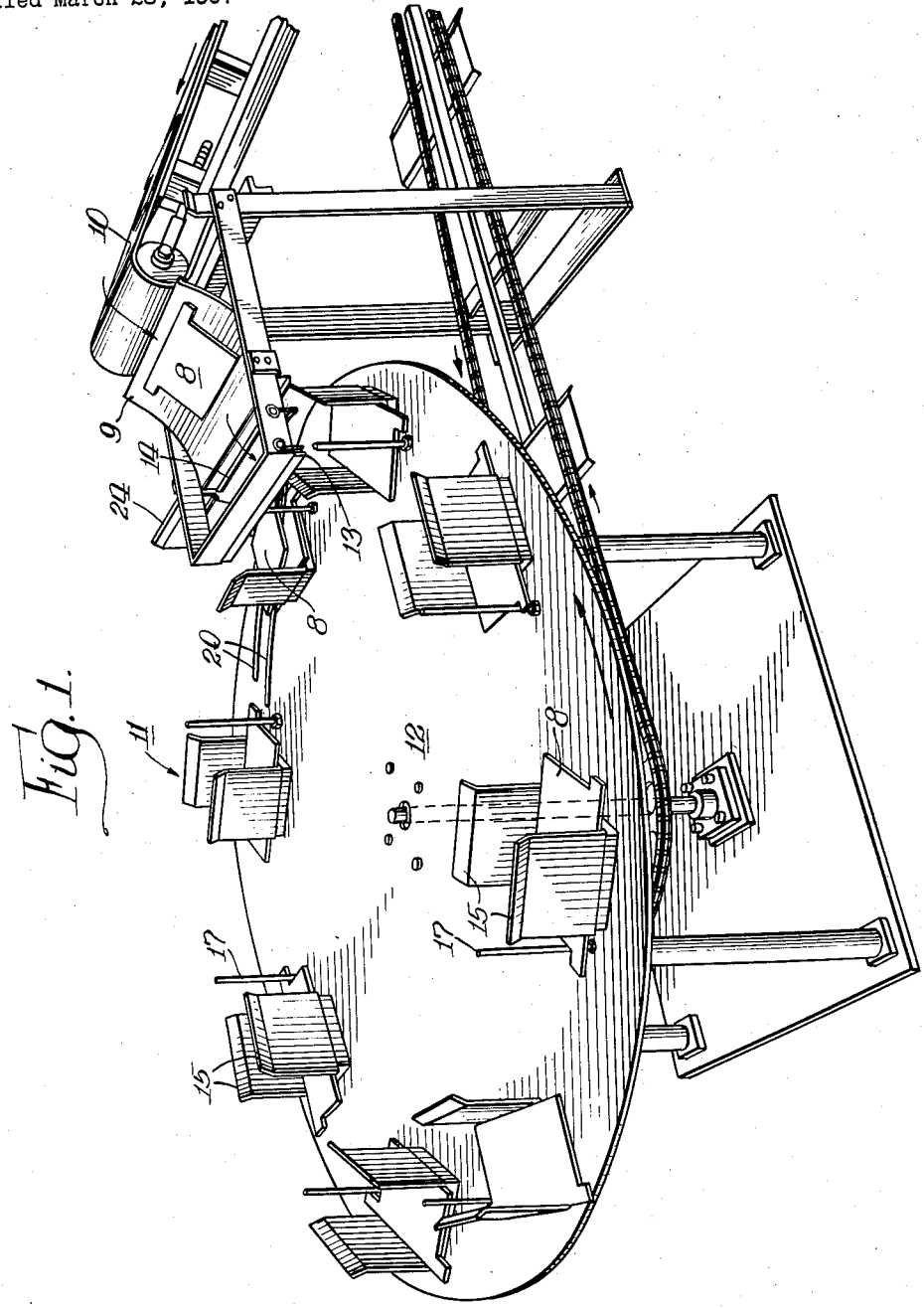
Figure 1 is a perspective view of stacking apparatus illustrating one embodiment of the present invention.

Successive battery grids 8 are fed to a slide 9 which may be considered as a part of the stacking apparatus. Where convenient, the battery grids may be fed to the slide 9 directly from grid producing machinery, for example, from a grid trimmer. However, where the trimmer is so constructed that the battery grids as delivered thereby are at a lower level than the slide 9, the grids may be received from the trimmer by an endless belt 10 which elevates the grids before delivering them to the slide, all as shown in Fig. 1.

In general, the stacking apparatus includes a plurality of receptacles 11 mounted on a rotating table 12. The embodiment of the invention disclosed herein includes eight such receptacles 11, and the table 12 is rotated in timed relationship with respect to a battery grid producing machinery or other source of grids such that successive battery grids, as delivered thereby to the stacking apparatus, are deposited in successive receptacles 11. The illustrated embodiment of the invention is therefore particularly adapted to use with grid producing machinery which incorporates eight separate molds. Even if each of the eight molds were arranged to produce different battery grids, the illustrated embodiment of the invention will properly sort the eight varieties of battery grids fed thereto, each variety of battery grid being stacked in one particular receptacle 11.

Figure 4:
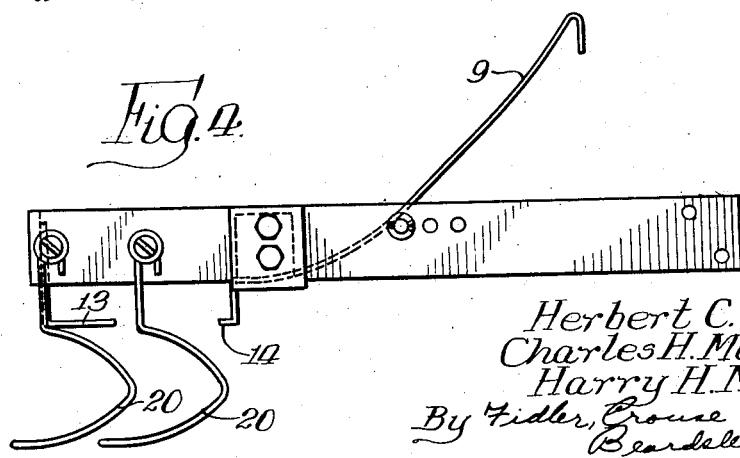
Fig. 4 is an elevational view of the apparatus of Fig. 3.

As best seen in Fig. 4, as a battery grid is fed to the slide 9, it slides down off the slide, its leading edge engaging and being halted by an angle piece 13 which is rigidly supported by a suitable framework. The trailing edge of the grid then drops onto a second angle piece 14, supported by the same frame. It will be noted that in the particular embodiment disclosed, the angle piece 14 is actually integral with the slide 9. The two angle pieces 13 and 14 support two opposed edges of the successive grids 8 preferably in a substantially horizontal plan. The two angle pieces are spaced apart to provide an opening therebetween, for reasons which will subsequently become apparent.

The receptacles 11 comprise primarily two opposed walls 15 spaced to receive grids therebetween. Preferably a bottom wall 16 of substantial thickness is provided for supporting the grids therein above the plane of the table 12 and with the ends of the grids overhanging the bottom wall such that the grids which accumulate in a receptacle 11 may readily be grasped for removal. Associated with each of the receptacles 11 is a vertical rod or peg 17 which is arranged adjacent the trailing end of the receptacle with which it is associated.

Figure 2:
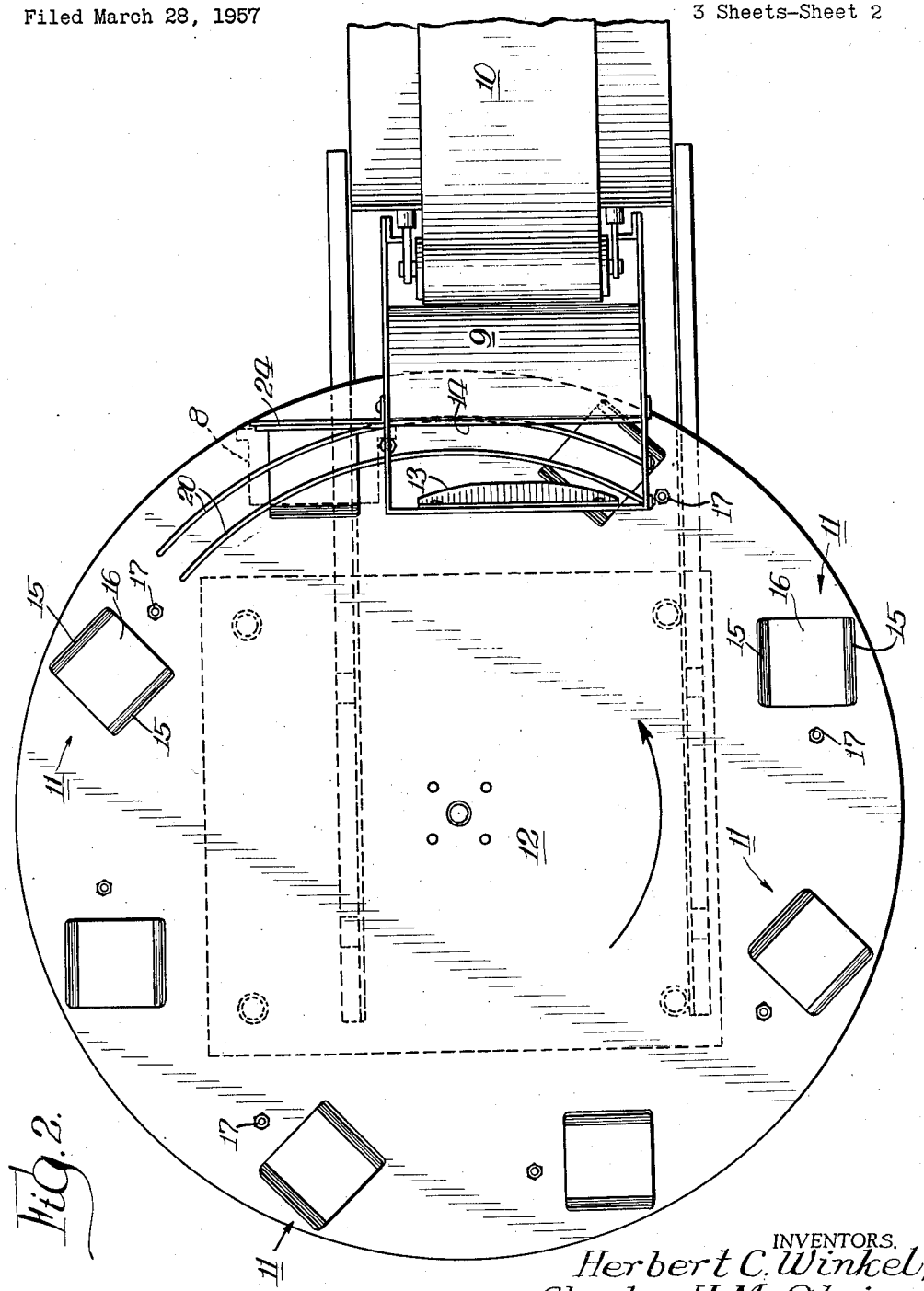
Fig. 2 is a plan view of the apparatus of Fig. 1.

The table 12 is so located with respect to the supports 13 and 14, and the receptacles 11 are so positioned thereon that as the table rotates, the receptacles are carried under and past the supports 13 and 14. Furthermore, the receptacles 11 are so oriented on the table that as they emerge from under these supports, the walls 15 thereof are substantially parallel to the supports 13 and 14 all as best seen in Fig. 2.

The associated pins or pegs 17 trail immediately behind the associated receptacle. These upright members extend upwardly between the supports 13 and 14 as they are carried past the supports by movement of the table 12. Accordingly, they engage one unsupported edge of the battery grid lying on the supports and advance the grid along the supports directly above the associated receptacle 11. As the grid passes beyond the ends of the supports its falls into the receptacle 11 which immediately precedes the peg 17.

It has been found that if the grid is permitted simply to fall off the ends of the supports 13 and 14, they will tend to tip over and fall askew. Furthermore, if the bottom wall of the receptacle 16 is arranged a sufficient distance below the supports to permit the reception of a substantial number of grids at one time, the grids are likely to be damaged in the resulting fall. Two features of the present invention are directed toward the avoidance of these undesired results.

As shown in the drawings, a pair of rods 20 are secured at one end to the frame, the other ends of the rods 20 being free. The rods are curved, such that they lie along the path of the receptacles, and are spaced apart by a distance substantially less than the space between the walls 15 of the receptacles 11. The rods 20 form a slide down which the grids may move under the guidance of the walls 15 of a receptacle 11 and under the influence of the asociated upright member 17. The slide thus formed by the two rods lowers the two grids gradually within the receptacles while permitting the passage of the peg 17 therebetween. Furthermore, the rods 20 being resilient, permit the lowering of grids within the receptacles to any desired level as dictated by the height of the stack of grids previously deposited therein. If desired, the free ends of the rods 20 may normally ride low, i. e., they may ride along the table and along the bottom walls of the receptacles or along the last deposited grids therein. However, the free ends of the rods preferably spring upwardly when unloaded, whereby a grid as it is moved off the supports 13 and 14 by the peg 17 may drop only a short distance. The rods are preferably sufficiently flexible that the weight of a grid thereon, particularly when the grid nears the free ends of the rods, causes the rods to sag such that the grid, as it leaves the rods, is deposited gently on the bottom of the receptacle or on the last previously deposited grid. Preferably the rods 20 are of a rough texture such that the grids will not slide down the rods ahead of the peg 17. Rough surfaces on the rods 20 produce friction such that a grid will drag and bear firmly against the peg 17. This assures that each grid deposited in a receptacle will abut the peg 17, and hence all of the grids in a receptacle will be stacked neatly such that they may readily be grasped for removal.

Figure 3:
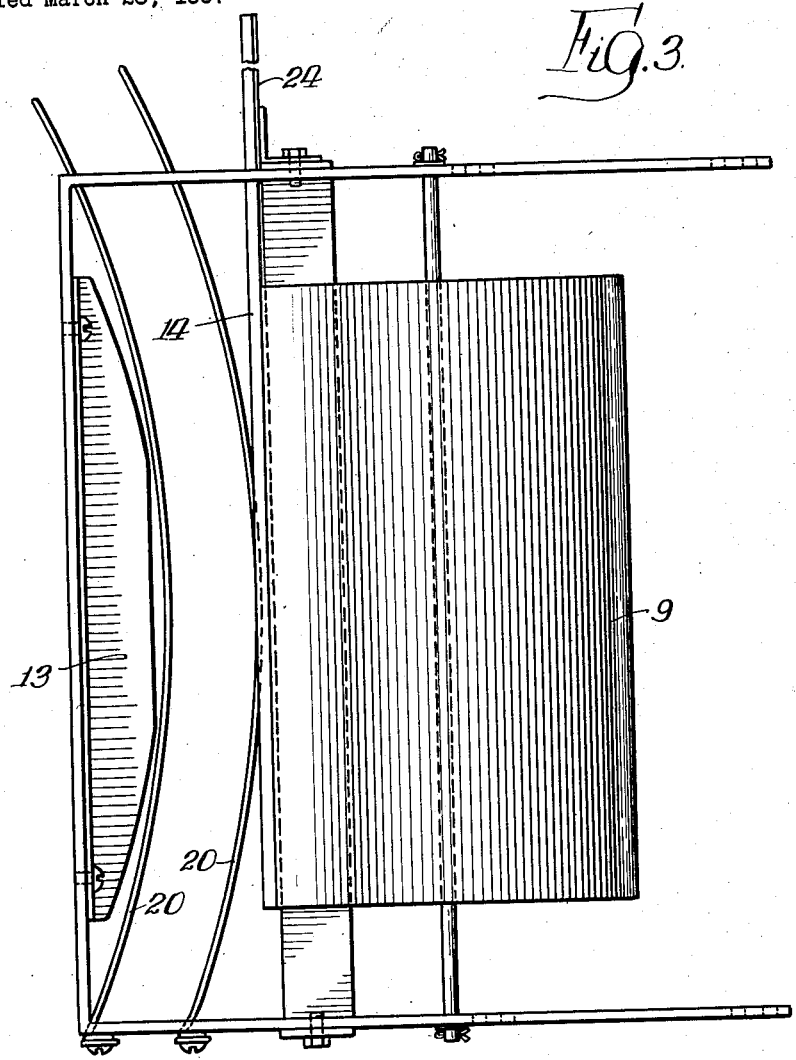
Fig. 3 is a greatly enlarged plan view of the central portion of the apparatus of Figs. 1 and 2.

In order to remove the tendency of grids to tip forwardly as the center of gravity thereof reaches the ends of the supports 13 and 14, an additional support 24 is provided which is, in effect, and may actually constitute, an extension of the support 14. The support 24 prevents the dropping of the grid until the trailing end, engaged by a peg 17, falls free of the support 13. When this occurs the entire lefthand side of the grid as viewed in Figs. 2 and 3 starts to fall. Since the actual supporting surface of the support 24 is very narrow, the righthand edge of the grid is almost immediately disengaged therefrom and falls only slightly behind the lefthand edge. The successive grids are thereby made to drop almost flatly. Furthermore it is assured that the grid will be in constant engagement with a peg 17 since the trailing edge of the grid is at no time tipped upwardly such that it might lose contact therewith. It will be apparent that either of the supports 13 or 14 may thus be extended to accomplish this effect.

The drive for the table 12 may be of any suitable form, well known in the art, and does not of itself constitute a feature of the present invention. Accordingly, it is not shown in the drawings or described in detail herein. It will be apparent that it should drive the table in synchronism with the delivery of grids to the supports 13 and 14 in such phase relationship that a grid is completely removed from its orignal position on the supports prior to the arrival of the succeeding grid.

In the embodiment of the invention shown in the drawings a circular, rotating table is employed as means for supporting and moving the receptacles. Such means need not be in the form of a table but may be in the form of a rotary spider, for example. Also, it need not have a rotary motion but may, if desired, be any suitable form of endless conveyor.

Under certain circumstances the rods 20, or their equivalent, might be omitted. In such case the extended support 14—24 may be of particular advantage. The rods 20 may also be raised to a level very nearly equal to that of the supports 13 and 14, or even slightly above. In the latter case the supports 13 and 14 would serve only to confine grids against lateral movement, just as do the walls 15 of the receptacles. In either case, the support extension 24 would become superfluous.

Thus while one embodiment has been shown and described, it will be apparent that the invention may be varied in its physical embodiment without departing from the spirit of the invention, and it is desired, therefore, that the invention be limited only by the scope of the appended claims.

The invention having thus been described, what is claimed to be secured by Letters Patent is:

1. Apparatus for stacking battery grids delivered seriatim thereto, said apparatus comprising a pair of spaced-apart elongated supports for receiving successive grids, said supports including vertical walls for limiting horizontal movement of a grid in two opposed directions and horizontal ledges for supporting two opposed edge portions of a grid, a plurality of grid receptacles having two opposed walls spaced to receive grids therebetween, a rotating table for carrying said receptacles under and past said supports in a direction generally parallel to said walls and to said supports, and a plurality of upright members associated one each with said receptacles and carried by said table adjacent the trailing end of said receptacles, said upright members when carried past said supports by said table extending upwardly beyond the horizontal ledges of said supports whereby said members may engage an unsupported edge of a grid and drive such grid off said supports and into the associated one of said receptacles, one of said supports extending beyond the other of said supports in the direction of movement of said receptacles a distance greater than the corresponding dimension of the grids handled by said apparatus, whereby each grid is supported by said supports until one of said upright members advances the trailing edge of said grid beyond said other support.

2. Apparatus for stacking battery grids delivered seriatim thereto, said apparatus comprising a pair of spaced-apart elongated supports for receiving successive grids and for supporting two opposed edge portions thereof, a plurality of grid receptacles, each having two opposed side walls spaced to receive grids therebetween, means for carrying said receptacles under and past said supports in a direction generally parallel to said walls and to said supports, a plurality of upright members associated one each with said receptacles and carried by said carrying means adjacent the trailing end of said receptacles, said upright members when carried past said supports by said carrying means extending upwardly beyond a grid carried by said supports whereby said members may engage an unsupported edge of a grid carried by said supports and drive such grid off said supports and into the associated one of said receptacles, and a pair of rods each having one end located adjacent and below said supports and arranged to extend gradually downward between said receptacle walls and through the leading and trailing ends of said receptacles as said receptacles are carried past said supports and terminating in a free end, whereby said upright members may advance grids downwardly along said rods within said receptacles and off the free ends of said rods.

3. The stacking apparatus of claim 2 in which said rods are resilient whereby said free ends thereof may extend downwardly substantially to the bottoms of said receptacles and may ride over stacks of grids within said receptacles.

4. The stacking apparatus of claim 2 in which said rods have rough surfaces whereby grids moved therealong by said upright members are frictionally retained against said members.

5. Apparatus for stacking battery grids delivered seriatim thereto, said apparatus comprising a pair of spaced-apart elongated supports for supporting two opposed edge portions of a grid, a plurality of grid receptacles having two opposed walls spaced to receive grids therebetween, a rotating table for carrying said receptacles under and past said supports in a direction generally parallel to said walls and to said supports, a plurality of upright members associated one each with said receptacles and carried by said table adjacent the trailing end of said receptacles, said upright members when carried past said supports by said table extending upwardly beyond said supports whereby said members may engage an unsupported edge of a grid and drive it off said supports and into the associated one of said receptacles, and a pair of rods each having one end located adjacent and below said supports and arranged to extend circumferentially about the axis of rotation of said table and gradually downward between said receptacle walls and through the leading and trailing ends of said receptacles as said receptacles are carried past said supports and terminating in a free end, whereby said upright members may advance grids downwardly along said rods within said receptacles and off the free ends of said rods.

6. The stacking apparatus of claim 5 in which said rods are resilient whereby said free ends thereof may extend downwardly substantially to the bottoms of said receptacles and may ride over stacks of grids within said receptacles.

7. The stacking apparatus of claim 5 in which said rods have rough surfaces whereby grids moved therealong by said upright members are frictionally retained against said members.

References Cited in the file of this patent

UNITED STATES PATENTS

| 1,649,639 | Wright | Nov. 15, 1927 |
| 2,805,756 | Fowler | Sept. 10, 1957 |